United States Patent

Pourailly et al.

[11] Patent Number: 6,150,975
[45] Date of Patent: Nov. 21, 2000

[54] DIVERGENCE MEASUREMENT ANTENNA FOR SINGLE-PULSE RADAR

[75] Inventors: Jean-Louis Pourailly, Vincennes; Jean-Louis Soule, Verrieres le Buisson; Michel Gaudron; Alain Pages, both of Chatenay Malabry, all of France

[73] Assignee: Thomson-CSF, Paris, France

[21] Appl. No.: 08/722,338

[22] Filed: Sep. 27, 1996

Related U.S. Application Data

[63] Continuation of application No. 08/202,087, Feb. 25, 1994, abandoned.

[30] Foreign Application Priority Data

Feb. 6, 1993 [FR] France .................................. 93 02230

[51] Int. Cl.[7] .............................. G01S 13/00; G01S 7/02
[52] U.S. Cl. ................................ 342/153; 342/149
[58] Field of Search .................................. 342/148, 149, 342/153, 427

[56] References Cited

U.S. PATENT DOCUMENTS

| | | |
|---|---|---|
| 2,834,014 | 5/1958 | Thorne . |
| 2,956,275 | 10/1960 | Ashby ..................................... 342/427 |
| 3,040,310 | 6/1962 | Hausz ...................................... 342/153 |
| 3,121,855 | 2/1964 | Thiede .................................... 367/105 |
| 3,824,595 | 7/1974 | Hall . |
| 3,860,934 | 1/1975 | Cheo et al. ............................. 343/778 |
| 4,638,319 | 1/1987 | Chua ....................................... 342/417 |
| 5,034,752 | 7/1991 | Pourailly et al. . |
| 5,038,149 | 8/1991 | Aubry et al. . |
| 5,049,893 | 9/1991 | Coppier et al. . |
| 5,063,363 | 11/1991 | Coppier et al. . |

FOREIGN PATENT DOCUMENTS

| | | |
|---|---|---|
| 0 106 494 | 4/1984 | European Pat. Off. . |
| 800433 | 7/1936 | France . |
| 27 02 114 | 10/1980 | Germany . |

*Primary Examiner*—Ian J. Lobo
*Attorney, Agent, or Firm*—Oblon, Spivak, McClelland, Maier & Neustadt, P.C.

[57] ABSTRACT

A divergence measurement antenna for single-pulse radars comprises at least two radiant panels. With their beams having the same center of phase, they are oriented differently. A monotonic function of the angular divergence of a signal received by the antenna is obtained from the ratio of the power of the signal received by the first panel to its power received by the second panel. An even-parity function of the signal received is obtained by taking the sum of these two signals. Application to precise measurements of angular divergence.

7 Claims, 4 Drawing Sheets

DIVERGENCE MEASUREMENT ANTENNA FOR SINGLE-PULSE RADAR

This application is a Continuation of application Ser. No. 08/202,087, filed on Feb. 25, 1994, now abandoned.

BACKGROUND OF THE INVENTION

The present invention relates to a deviation measurement antenna for a single-pulse radar. It can be applied notably to antennas with a function of providing elements for the measurement of angles that are smaller than the aperture of the antenna beam, these angles defining a divergence between the direction of a detected target and the direction aimed at by the antenna.

Divergence measurement consists of the measurement of the above-mentioned angles in order to locate a target in space with precision. Several divergence measurements are generally used, notably in relative bearing and in elevation. To obtain a divergence measurement for a detected signal, it must be related, by a one-to-one relationship, with an angular divergence from the direction aimed at by the antenna. For this purpose, it is necessary to set up a function of the angular divergence in the interval of measurement, this function being a monotonic one. It is generally an increasing, odd-parity value. In the case of single-pulse radars, where all the information elements are obtained after a single transmission pulse, with this first function associated with a first reception circuit generally called a difference channel or divergence measurement circuit, there is combined a second even-parity function associated with a second reception circuit generally called a sum channel. By standardizing the signal given by the first, monotonic function, this second function can be used to obtain a characteristic signal of the angular divergence of the targets detected by a one-to-one relationship.

Known antennas can be used to set up reception channels needed for measurements of divergence in single-pulse radars. This is the case notably with reflector antennas or passive lens antennas and antennas in arrays with or without electronic scanning.

Reflector or passive lens type antennas have a fixed direction of aim. They are oriented mechanically as required, generally after the processing of the information elements given by the divergence measurement. To form the reception channels, it is possible, for example, to use two horns located on either side of the focal point of the antenna. The two channels are obtained by taking the sum and the difference of the signals coming from the horns, by using for example the orthogonal outputs of a magic T. It is also possible to use a multiple mode horn.

One drawback of this approach arises notably out of the fact that it is difficult to exploit the antenna patterns obtained without an improvement that would increase the complexity of the antenna and hence its cost.

The antenna arrays with or without electronic scanning are used notably to make the radiating apertures of slabs and lenses.

In antennas constituted by arrays of slabs, the signals coming from the radiating elements, distributed on a plane for example, are collected individually and then assembled by combiners that form the necessary channels. The combiners are arranged, for example, as an espalier or a Blass matrix, made in the form of a strip line waveguide or a microstrip line waveguide. These combiners with several channels are fairly complex. The making of these combiners so as to obtain the qualities required by modern antennas is a delicate and costly undertaking.

In the case of lens arrays, the signals coming from the radiating elements, distributed on a plane for example, pass through fixed or electronic phase-shifters and are then radiated to sensors located in the vicinity of a focal point. The phase-shifters are given the task of converting the received wave which is locally plane into a spherical wave centered on the focal point. After this conversion of the received wave, it is possible to use the techniques reserved for reflector antennas, whether or not they are with multiple-mode horns. However, an approach such as this is still complicated and costly to implement. Furthermore, it is cumbersome because of the thickness of the lenses that it causes, notably in the case of an electronic scanning antenna where every element used for the electronic scanning must have this thickness.

The use of digitally controlled precision manufacturing means enables the low-cost manufacture notably of slotted waveguides with very good performance characteristics. However, in an antenna made with slotted waveguides, the weighting of the aperture is achieved by the judicious coupling of the slots to the waveguide. This coupling is fixed once and for all at the time of manufacture and it is difficult to implant a second channel, a second orthogonal weighting to create the even-parity and odd-parity reception channels needed to obtain the divergence measurement.

SUMMARY OF THE INVENTION

The aim of the invention is to overcome the above-mentioned drawbacks notably by making it possible to set up a divergence measurement function that is simple to implement and is designed for precise measurements of angular divergence.

To this end, an object of the invention is a divergence measurement antenna for a single-pulse radar comprising at least two radiant panels wherein, with their beams having the same phase center, they are oriented differently, a monotonic function of the signal received by the antenna being obtained from the ratio of its power received by the first panel to its power received by the second panel, an even-order function of the received signal being obtained by taking the sum of the signals received in the beams.

The main advantages of the invention are that it enables the precise localization of a target in space, can be used to obtain measurements of angles that are smaller than the aperture of the antenna beam, is suited to all the antenna frequencies and is economical.

BRIEF DESCRIPTION OF THE DRAWINGS

Other features and advantages of the invention shall appear from the following description, made with reference to the appended drawings of which.

DESCRIPTION OF THE INVENTION

Figure 1:
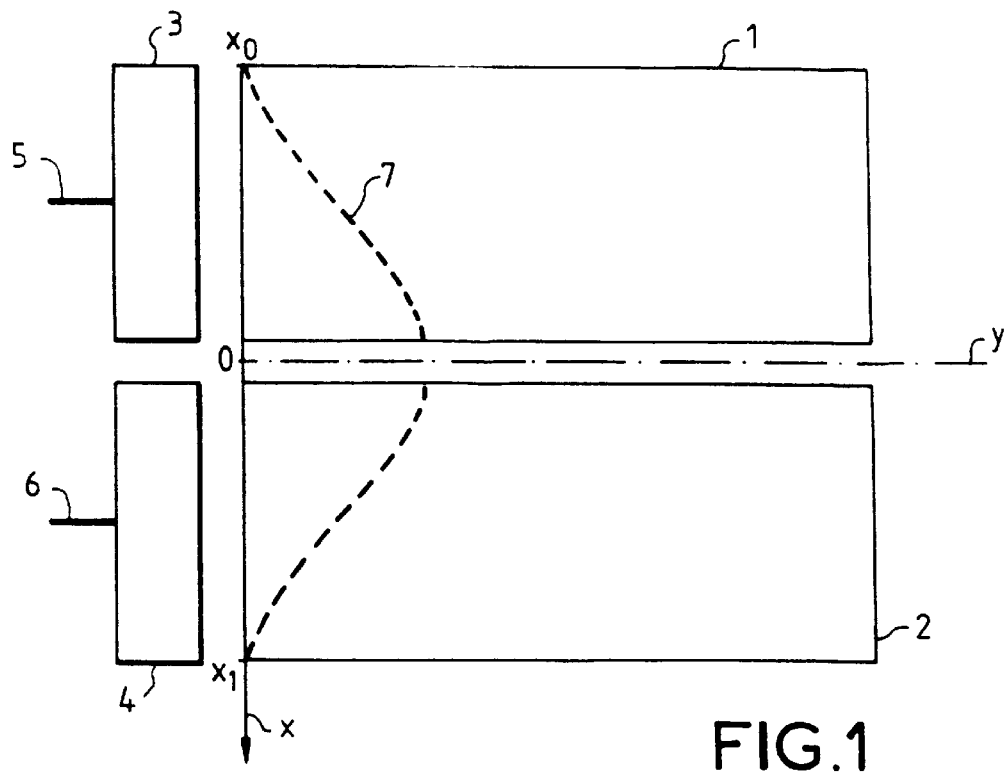
FIG. 1 shows a schematic drawing of an antenna according to the invention.

FIG. 1 is a schematic top view of an antenna according to the invention. It comprises at least two radiant panels 1, 2.

These two panels have, for example, the same dimensions. A first radiant panel 1 is coupled to first power distribution means 3 and a second radiant panel 2 is coupled to second power distribution means 4. These first power distribution means 3 and second power distribution means 4 are connected to a microwave source by supply lines 5, 6, coaxial cables or rectangular waveguides for example.

A dashed curve 7 represents the form taken by the distribution of power emitted by these two radiant panels 1, 2. A first axis x being defined in the figure and being merged with the sides of the panels facing the power distribution means 3, 4, the starting point $x_o$ of the curve 7 being in a corner of the first panel 1 that is opposite the second panel 2, this curve 7 increases from the starting point $x_o$ up to the opposite side of the first panel 1. It is symmetrical with respect to a second axis y located between the two panels 1, 2 and equidistant from these panels, in such a way that it decreases from the side of second panel 2 which is contiguous to this second axis y up to a point x1 of the first axis x belonging to the opposite side of the second panel 2. Taken in a reference system having the point 0 of intersection of the two axes x,y and constituted by these two axes x, y, the curve 7 of the power distribution in the panels 1, 2 represents an even-order function.

Figure 2:
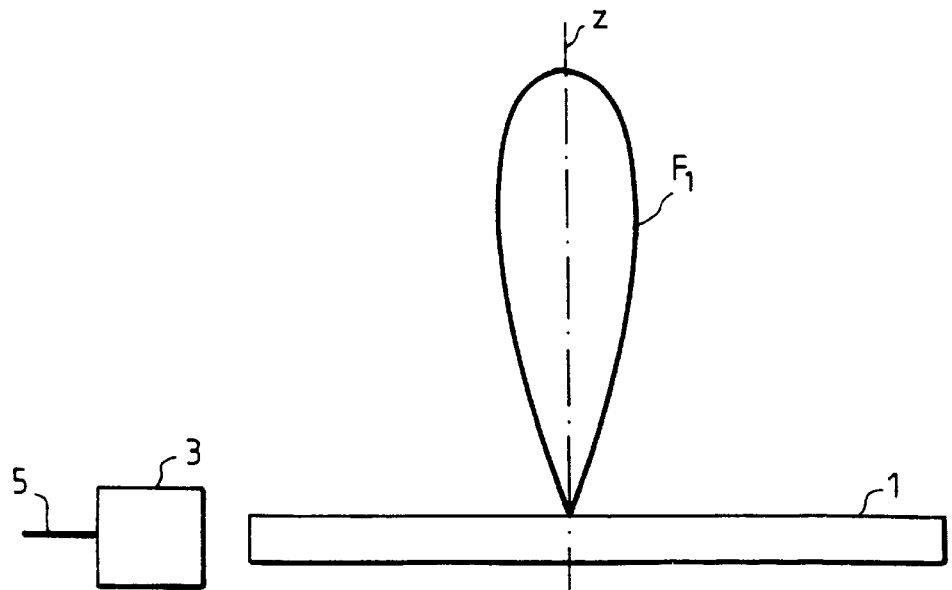
FIG. 2 shows a beam of an antenna panel.

As shown in FIG. 2, each panel has its own emission beam.

FIG. 2 illustrates a first panel 1 seen from the side with its beam F1 substantially symmetrical about a third axis z perpendicular to the plane of the panel 1 and intersecting it in its middle for example.

Figure 3:
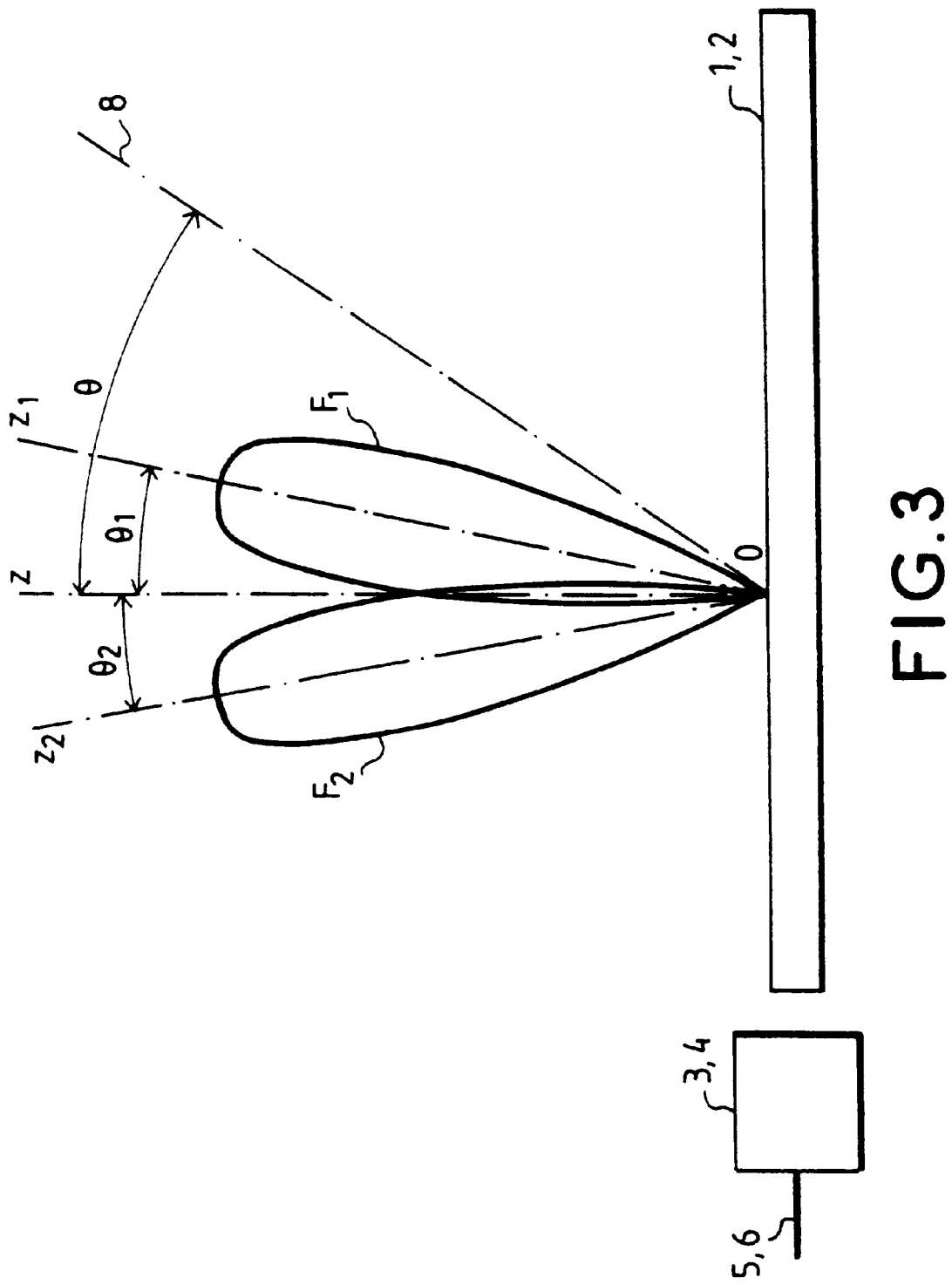
FIG. 3 illustrates the principle of operation of an antenna according to the invention.

FIG. 3 illustrates the principle of operation of an antenna according to the invention. The two radiant panels 1, 2 are seen from the side, the first panel 1 concealing, for example, the second panel 2. The beams F1, F2 of the radiant panels 1, 2 are oriented differently. The beam F1 of the first panel 1 is oriented in such a way that the projection of its axis of symmetry z1 forms a first angle of aim θ1 with the projection of the above-mentioned third axis z which is perpendicular to the first panel 1 in the plane of the figure. The beam F2 of the second panel 2 is oriented in such a way that the projection of its axis of symmetry z2 forms a second angle of aim with the projection of the third axis z in the plane of the figure, the two axes of symmetry z1, z2 forming, with each other, in the plane of the figure, the sum θ1+θ2 of the above two angles θ1, θ2. This plane of the figure is a plane that is orthogonal to the first axis x and is parallel to the second axis y. It may, for example, be called the plane of symmetry of the antenna.

To set up the divergence measurement, a monotonic function of the angular divergence is carried out in the measurement interval. This function is set up, for example, from the ratio of the values of power received by the two panels.

Should the beams F1, F2 of the radiant panels be Gaussian, which is often the case, then the values of power P1, P2 received in a direction 8 received in a direction 8 whose projection in the above-mentioned plane of symmetry of the antenna forms an angle θ with the projection of the third axis z in this same plane, are expressed by the following relationships:

$$P1 = g1 e^{a(\theta+\theta 1)^2} \quad (1)$$

$$P2 = g2 e^{a(\theta-\theta 2)^2} \quad (2)$$

P1 and P2 being respectively the values of power received by the first and second radiant panels, g1 and g2 being respectively the gains of the first and second panels and a being a constant related to the dimensions and to the illumination of the radiant panels. The angles θ1, θ2 are the above-mentioned angles of aim.

Taking θ1=θ2=θD, we get:

$$\frac{P1}{P2} = \frac{g1}{g2} e^{4a\theta D\theta} \quad (3)$$

This ratio of the power values received by the two panels 1,2 whose beams are oriented differently truly constitutes a monotonic function of the angular divergence θ of a target sending back a signal to the antenna. This angular divergence may be, for example, a divergence in relative bearing, the angles θ1, θ2, θ in question being cases of divergence between the projections of the directions in the plane of symmetry of the antenna, the directions being taken from the point 0 of intersection of the first axis x and the second axis y.

Figure 4:
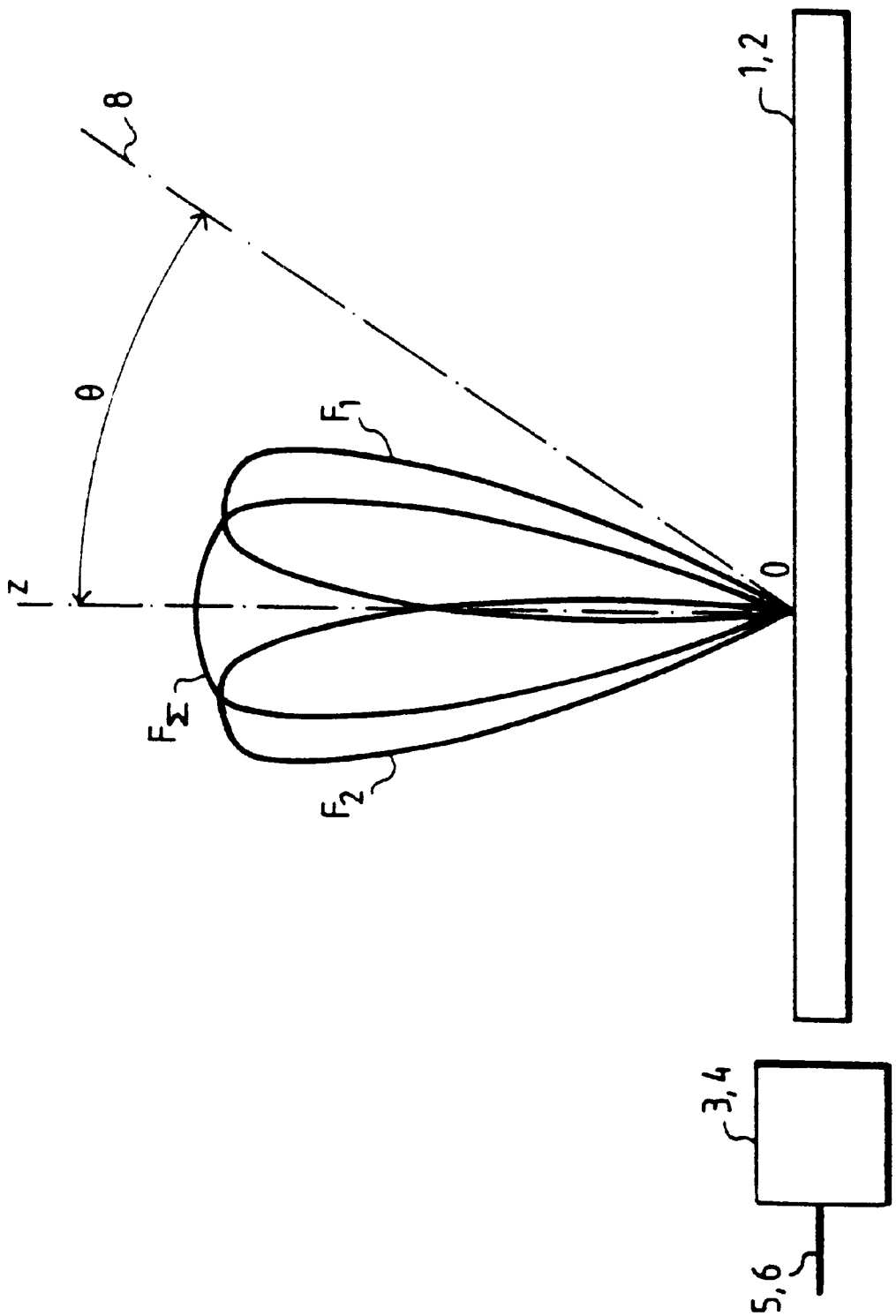
FIG. 4 shows a beam obtained from the beams of two antenna panels.

In fact, taking the distribution of power as described with respect to FIG. 1 and the beams F1, F2 of the first and second panels having substantially the same center of phase, it is then possible, if the angular divergence between the two beams F1, F2 is not excessive, to set up a sum beam FΣ as illustrated in FIG. 4, which is the sum of the two preceding beams, a signal received in this beam corresponding to the sum of the signals received in the two preceding beams F1, F2, this sum constituting an even-parity function of the received signal as a function of its angle θ of detection. This angle θ is the angle between the projection, in the plane of symmetry of the antenna, of the direction of the detected target taken from the point 0 of intersection of the first axis x and the second axis y and, for example, of the projection of the third axis z in the same plane. This point 0 of intersection constitutes the center of phase of the two beams F1, F2.

The even-parity function obtained, which is associated with the monotonic function, makes it possible to carry out a divergence measurement, in relative bearing for example.

In order to make the monotonic function set up in the relationship (3) easier to use, it is possible, for example, to take its logarithm. In this case, the function is no longer just the ratio of the power values P1, P2 but the logarithm of this ratio of power values. The monotonic function f of the above mentioned angular divergence θ is then set up by the following relationship:

$$f(\theta) = [4a\theta D \log e]\theta + [\log g1 - \log g2] \quad (4).$$

Figure 5:
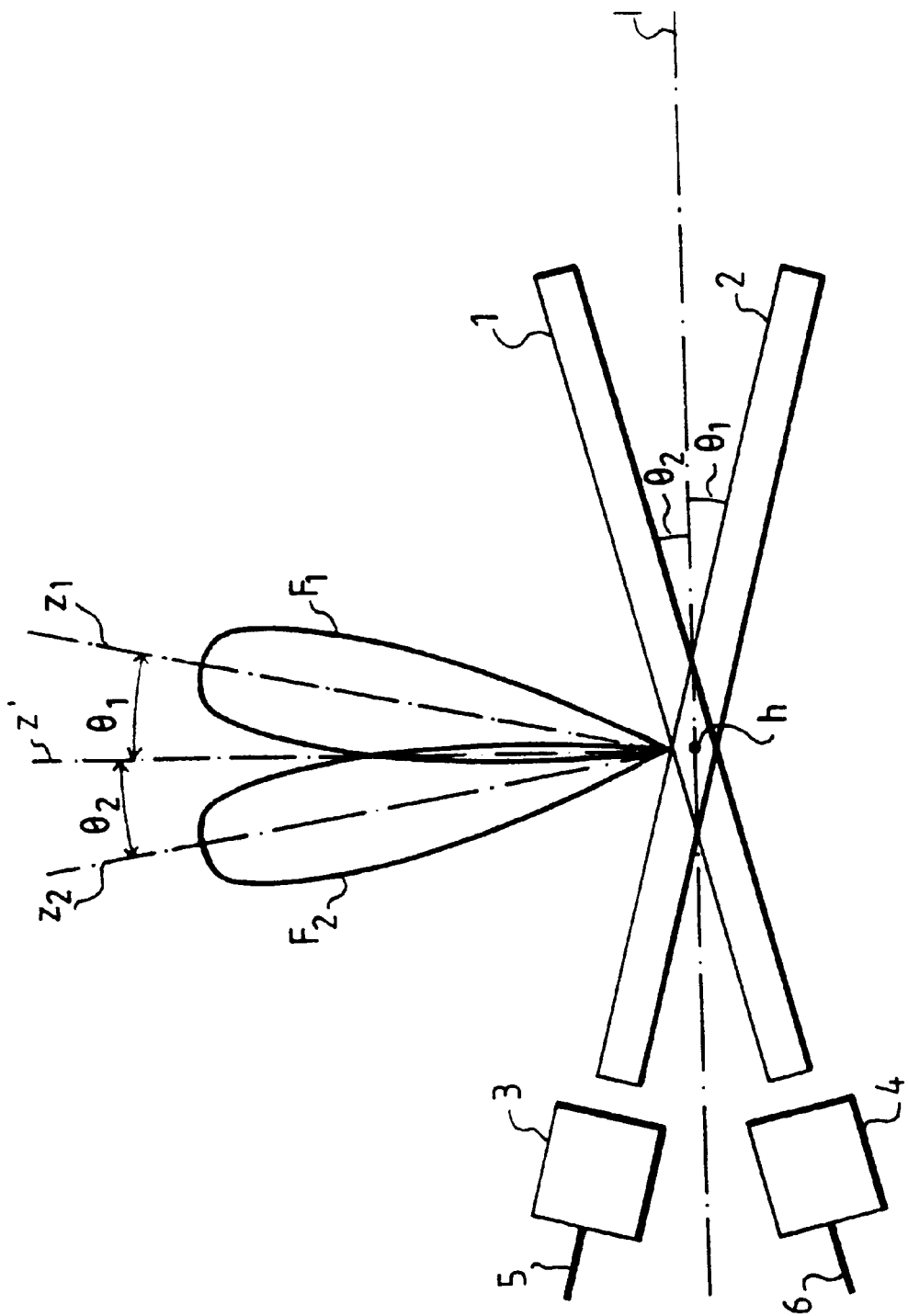
FIG. 5 shows a possible embodiment of an antenna according to the invention.

FIG. 5 illustrates a possible embodiment of the antenna according to the invention. The panels 1, 2 are constituted, for example, by slotted waveguides. Since the distribution of power in the panels is the same as it was previously, and since the axes of symmetry z1, z2 of their beams F1, F2 are perpendicular to their planes, or fixed with respect to these planes, the first radiating panel 1 and second radiating panel 2 are respectively offset by an angle θ1, θ2 on either side of their initial common plane Po by rotation about an axis h that is contained in this plane and that intersects, for example, the panels 1, 2 in their middles. These angular offsets make it possible, notably, to offset the beams F1, F2 with respect to each other, the angular offsets θ1, θ2 being, for example, equal to a given angle θD. The distribution means 3, 4 of the radiant panels 1, 2 are themselves, for example, also offset so as to remain in a position of facing their respective panels.

FIG. 5 shows that the offset between the beams F1, F2 may be obtained by mechanical rotation. It is also possible to make the beams rotate electronically by taking, for example, slotted waveguides for the first panel that have an initial aim which is different from that taken by the guides of the second panel. For this purpose, it is enough, for example, to take spacing values between the slots of the waveguides that are different from one panel to the other. It is possible, for example, in this way to offset only one beam.

Should the radiant elements of the panels no longer be slots supplied by waveguides but elements of another type, supplied by an equiphase distributor, arranged as an espalier for example, it is possible, for the first panel, to place lines at output of this distributor, these lines having lengths such that a linear phase variation is set up along the array of radiant elements, which makes it possible to offset the beam of this first panel in one direction. For the second panel, a variation with a slope in the reverse direction may be set up to offset its beam in the opposite direction, the beam remaining the same.

The invention may be applied, for example, to all antennas in arrays that can be divided into two panels.

What is claimed is:

1. An antenna for a single-pulse radar, said antenna having a plane of symmetry and comprising:

at least two radiant panels wherein each of said at least two panels provide respective beams with the phase center of each of said respective beams being the same but with each beam being oriented differently with respect to said plane of symmetry and each of said panels receiving a respective measured power signal from an incoming reception signal at a fixed angle with respect to said plane of symmetry wherein the ratio of the measured power signal received by one of said panels to the measured power signal received by another one of said panels is a monotonic function of said fixed angle and wherein the sum of said respective measured power signals received by said one panel and said another one panel is an even-order function of said fixed angle, whereby a measurement of the divergence between a detected target and a direction of aim of said antenna is provided.

2. An antenna according to claim 1 wherein, with the power being distributed in the panels by distribution means, a first axis being merged with the sides of the panels facing the distribution means, a second axis being located between the panels and being equidistant from them, the power increases from a point of the first axis located on the side of the first panel opposite the second panel up to the second side of the first panel facing the second panel, the power being distributed in the second panel in such a way that it is symmetrical on the entire unit formed by the two panels, with respect to the second axis.

3. An antenna according to claim 1, wherein the monotonic function is the logarithm of the ratio between the two values of power received by the first panel and the second panel.

4. An antenna according to claim 1, wherein the panels are offset by a given angle with respect to each other through rotation about an axis included in these panels.

5. An antenna according to claim 4, wherein the panels are constituted by slotted waveguides.

6. An antenna according to claim 1, wherein the angular offset of the beams is obtained electronically.

7. An antenna according to claim 7 wherein, with the panels being constituted by slotted guides, the spacing between the slots differs from one panel to the other.

* * * * *

UNITED STATES PATENT AND TRADEMARK OFFICE
CERTIFICATE OF CORRECTION

PATENT NO. : 6,150,975
DATED : November 21, 2000
INVENTOR(S) : Jean-Louis Pourailly, et al.

It is certified that error appears in the above-identified patent and that said Letters Patent is hereby corrected as shown below:

<u>Title page, item [30],</u>
Foreign Application Priority Data is listed incorrectly. Item [30] should read as follows:

[30]   Foreign Application Priority Data

Feb. 26, 1993   [FR]   France........................... 93 02230

Signed and Sealed this

Eighteenth Day of September, 2001

Attest:

NICHOLAS P. GODICI
*Attesting Officer*   *Acting Director of the United States Patent and Trademark Office*